United States Patent
Ensminger et al.

(10) Patent No.: US 11,440,080 B2
(45) Date of Patent: Sep. 13, 2022

(54) METHOD FOR PRODUCING A HEAT EXCHANGER

(71) Applicant: Mahle International GmbH, Stuttgart (DE)

(72) Inventors: Steffen Ensminger, Notzingen (DE); Thomas Feldhege, Leinfelden-Echterdingen (DE); Bernd Gruenenwald, Nuertingen (DE); Frank Koch, Korntal-Muechingen (DE); Andreas Koenig, Muehlacker (DE); Michael Kranich, Gemmrigheim (DE); Matthias Tuerpe, Ludwigsburg (DE); Cord Voelker, Backnang (DE)

(73) Assignee: Mahle International GmbH

( * ) Notice: Subject to any disclaimer, the term of this patent is extended or adjusted under 35 U.S.C. 154(b) by 0 days.

(21) Appl. No.: 17/204,933

(22) Filed: Mar. 17, 2021

(65) Prior Publication Data
US 2021/0291253 A1    Sep. 23, 2021

(30) Foreign Application Priority Data
Mar. 18, 2020   (DE) .......................... 102020203502.4

(51) Int. Cl.
| | |
|---|---|
| *B21D 53/04* | (2006.01) |
| *B23K 101/14* | (2006.01) |
| *B23K 1/002* | (2006.01) |
| *H05B 6/10* | (2006.01) |
| *B21D 53/02* | (2006.01) |
| *B23K 1/00* | (2006.01) |

(52) U.S. Cl.
CPC .............. *B21D 53/04* (2013.01); *B21D 53/02* (2013.01); *B23K 1/002* (2013.01); *B23K 1/0012* (2013.01); *B23K 2101/14* (2018.08); *H05B 6/101* (2013.01); *Y10T 29/4935* (2015.01); *Y10T 29/49366* (2015.01); *Y10T 29/49393* (2015.01)

(58) Field of Classification Search
CPC .............. B23K 1/0012; B23K 2101/14; Y10T 29/4935; Y10T 29/49366; Y10T 29/49393; B21D 53/02
USPC ......... 228/183; 29/890.03, 890.039, 890.054
See application file for complete search history.

(56) References Cited

U.S. PATENT DOCUMENTS

| | | | | |
|---|---|---|---|---|
| 4,619,716 A | * | 10/1986 | Suzuki ................... | B23K 1/203 148/26 |
| 2002/0023947 A1 | * | 2/2002 | Kimura ................... | F28F 13/18 228/262.5 |
| 2002/0141155 A1 | * | 10/2002 | Pinneo ................ | H01L 23/3732 361/688 |
| 2009/0202858 A1 | * | 8/2009 | Herber ...................... | F28D 9/00 428/637 |

(Continued)

FOREIGN PATENT DOCUMENTS

WO    WO-12/069417 A1    5/2012

*Primary Examiner* — Sarang Afzali
*Assistant Examiner* — Darrell C Ford
(74) *Attorney, Agent, or Firm* — Fishman Stewart PLLC

(57) ABSTRACT

A method for producing a heat exchanger is disclosed. The method includes a) providing two heat exchanger plates of the heat exchanger that are to be joined to one another; b) wetting at least one common local joining zone of the two heat exchanger plates with solder; c) forming the heat exchanger by brazing the two heat exchanger plates via local heating of the at least one common joining zone.

19 Claims, 2 Drawing Sheets

(56) References Cited

U.S. PATENT DOCUMENTS

| | | | |
|---|---|---|---|
| 2010/0224351 A1* | 9/2010 | Sasaoka | B23K 1/203 |
| | | | 165/180 |
| 2013/0001272 A1* | 1/2013 | Kurihara | B23K 1/0012 |
| | | | 228/9 |
| 2013/0180694 A1* | 7/2013 | Englert | B21C 37/151 |
| | | | 165/168 |
| 2013/0287379 A1* | 10/2013 | Yoshitomi | B21D 51/24 |
| | | | 392/486 |
| 2014/0193683 A1 | 7/2014 | Mardall et al. | |
| 2014/0196286 A1* | 7/2014 | Hong | F28D 1/0333 |
| | | | 29/890.039 |
| 2015/0118514 A1* | 4/2015 | Zhao | C25D 5/10 |
| | | | 428/184 |
| 2015/0251282 A1* | 9/2015 | Angermann | B23P 15/26 |
| | | | 29/890.035 |
| 2016/0091252 A1 | 3/2016 | Hofmann et al. | |
| 2016/0271716 A1* | 9/2016 | Goebel | B23K 1/0012 |
| 2017/0252872 A1* | 9/2017 | Hartmann | F16L 41/084 |
| 2018/0214963 A1* | 8/2018 | Hosono | B23K 1/002 |

* cited by examiner

METHOD FOR PRODUCING A HEAT EXCHANGER

CROSS-REFERENCE TO RELATED APPLICATION

This application claims priority to German Application No. DE 10 2020 203 502.4 filed on Mar. 18, 2020, the contents of which are hereby incorporated by reference in its entirety.

TECHNICAL FIELD

The invention relates to a method for producing a heat exchanger and to a brazing tool which is preferably designed to carry out this method. The invention also relates to a heat exchanger which is produced by carrying out such a method and to a motor vehicle having such a heat exchanger.

BACKGROUND

It is known to produce heat exchangers which comprise components to be joined to one another which, in the course of the production of the heat exchanger, are brazed to one another. Use is customarily made here of vacuum brazing furnaces or controlled atmosphere brazing (CAB) furnaces.

However, it is the case here that a heat exchanger is usually heated completely, that is to say with all of the components of the heat exchanger, with the result that partial melting of the components of the heat exchanger can occur if they have a solidus temperature which lies below the joining temperature of the furnace—that is to say usually the melting temperature of the solder used for joining.

In addition, on account of the complete heating of all the components, such a method is associated with a high energy consumption and a long production time.

It is therefore an object of the present invention to provide an improved or at least alternative production method for a heat exchanger. In particular, such a method is intended to produce heat exchangers with a high mechanical strength, with the result that the heat exchangers created also have an extended service life when they are used in a motor vehicle and are exposed there to high pressures and temperatures. Furthermore, such a method is intended to have a particularly low energy consumption and a particularly short manufacturing time.

This object is achieved according to the invention by the subject matter of the independent patent claim(s). Advantageous embodiments form the subject matter of the dependent patent claims.

SUMMARY

The basic idea of the invention is accordingly for two components to be joined to one another—such as for example heat exchanger plates—of a heat exchanger to be heated only locally in the region of the joining zone, that is to say to avoid heating of the heat exchanger plates outside of the joining zone. It is ensured in this way that the components are optimally joined together to form the heat exchanger by adequately melting the solder used during brazing. There is at the same time avoided an undesired reduction or even avoidance of partial melting of the components. Moreover, such a production method is characterized by a low energy consumption and a particularly short manufacturing time.

The method according to the invention serves for producing a heat exchanger having at least two heat exchanger plates. According to the method, the two heat exchanger plates of the heat exchanger that are to be joined to one another are provided, and at least one common local joining zone of the two heat exchanger plates is wetted with solder. The heat exchanger is then formed by brazing the two heat exchanger plates by means of local heating of the at least one joining zone.

According to one preferred embodiment, the two heat exchanger plates are pressed together in the region of the at least one joining zone during or after brazing. It has been possible to demonstrate that an improved mechanical strength can be achieved in the heat exchanger produced in such a way.

According to one advantageous embodiment, the at least one joining zone is locally heated by means of at least one heating element configured as electrical induction device. In this way, the at least one joining zone is heated particularly efficiently and locally—that is to say while avoiding a heating of the heat exchanger plates outside of the joining zone. As a result, partial melting of the heat exchanger plates when joining the latter to form the heat exchanger is strongly reduced or even completely avoided. In addition, the energy consumption of the production method and the manufacturing time of the heat exchanger are considerably reduced.

According to a further advantageous embodiment, the at least one joining zone is locally heated by means of at least one heating element configured as an electrical heating bar. In this way, too, the energy consumption of the production method and the manufacturing time of the heat exchanger are reduced to a not insignificant extent. In addition, the joining zone is heated particularly efficiently and only locally, with the result that the occurrence of partial melting of the heat exchanger plates when joining the latter to form the heat exchanger is particularly reduced or even completely avoided.

It is likewise advantageous for the at least one joining zone to be locally heated by means of at least one heating element configured as an irradiating device, in particular as an infrared irradiating device. In this way, too, the at least one joining zone is heated particularly efficiently and particularly in a locally limited manner with the avoidance of a heating of the heat exchanger plates outside of the joining zone. In this way, too, partial melting of the heat exchanger plates when joining the latter to form the heat exchanger is particularly strongly reduced or even completely avoided, and the energy consumption of the production method and the manufacturing time of the heat exchanger are considerably reduced.

According to a further advantageous embodiment, the at least one joining zone is locally heated by means of at least one heating element configured as a hot-air device.

The two heat exchanger plates are particularly preferably pressed together in the region of the at least one joining zone by means of at least one pressing element of the brazing tool that is designed to locally heat the at least one joining zone. This embodiment proves to be particularly simple and thus able to be implemented in a time-saving manner and ensures particularly effective and quick joining together of the heat exchanger plates to form the heat exchanger by adequate melting of a solder used during the brazing.

According to a further preferred embodiment, the solder is cured by cooling the at least one joining zone by means of a cooling device, in particular a cooling-air device. By means of this embodiment there is achieved a production method having a particularly low energy consumption and a particularly short manufacturing time for the heat exchanger to be produced.

The invention further relates to a heat exchanger which is produced by means of the method according to the invention. The advantages of the method according to the invention that have been explained above are thus applicable to the heat exchanger according to the invention.

Furthermore, the invention relates to a motor vehicle with a battery module having at least one battery cell and with a heat exchanger as presented above which, for cooling the battery module, interacts thermally therewith. The advantages of the method according to the invention and of the heat exchanger according to the invention that are explained above are thus applicable to the motor vehicle according to the invention.

The invention additionally relates to a brazing tool for producing a heat exchanger comprising two heat exchanger plates, in particular for cooling a battery module having at least one battery cell. The brazing tool is preferably designed to carry out the method according to the invention as presented above, with the result that in this case the advantages of the method according to the invention is applicable to the brazing tool according to the invention. The brazing tool comprises at least one heating section for locally heating at least one common joining zone of the two heat exchanger plates to be joined to one another, and a plate receptacle in which the two heat exchanger plates can be arranged in such a way that a joining zone is in each case arranged in the region of a heating section. This allows a particularly efficient and local heating of the at least one joining zone while avoiding a heating of the heat exchanger plates outside of the joining zone, with the result that partial melting of the heat exchanger plates when joining the latter to form the heat exchanger is particularly strongly reduced or even completely avoided. In addition, the energy consumption and the manufacturing time when producing the heat exchanger are considerably reduced.

According to one preferred embodiment, the brazing tool comprises at least one, preferably two, pressing element(s), delimiting the plate receptacle, for pressing together the two heat exchanger plates in the region of the at least one joining zone. This embodiment proves to be particularly effective and time-saving when producing the heat exchanger and ensures that the heat exchanger plates are joined together particularly effectively to form the heat exchanger by adequate melting of a solder used during the brazing with simultaneous reduction or even avoidance of partial melting of the components.

According to one advantageous embodiment, the brazing tool comprises at least one heating element, which is preferably arranged in the at least one heating section and configured as an electrical induction device, for locally heating the at least one joining zone. In this way, the at least one joining zone is heated particularly efficiently and particularly in a locally limited manner while avoiding a heating of the heat exchanger plates outside of the joining zone. Partial melting of the heat exchanger plates when joining the latter to form the heat exchanger is thus particularly strongly reduced or even completely avoided, and the energy consumption and the manufacturing time when producing the heat exchanger are considerably reduced.

According to a further advantageous embodiment, the brazing tool comprises at least one heating element, which is preferably arranged in the at least one heating section and configured as an electrical heating bar, for locally heating the at least one joining zone. In this way, too, the energy consumption and the manufacturing time when producing the heat exchanger are considerably reduced, and the at least one joining zone is heated particularly efficiently and particularly in a locally limited manner while avoiding a heating of the heat exchanger plates outside of the joining zone, with the result that partial melting of the heat exchanger plates when joining the latter to form the heat exchanger is particularly strongly reduced or even completely avoided.

It is likewise advantageous for the brazing tool to comprise at least one heating element, which is preferably arranged in the at least one heating section and configured as an irradiating device, in particular as an infrared irradiating device, for locally heating the at least one joining zone. In this way, too, the at least one joining zone is heated particularly efficiently and particularly in a locally limited manner while avoiding a heating of the heat exchanger plates outside of the joining zone. Partial melting of the heat exchanger plates when joining the latter to form the heat exchange is thus particularly strongly reduced or even completely avoided, and the energy consumption and the manufacturing time when producing the heat exchanger are considerably reduced.

According to a further advantageous embodiment, the brazing tool comprises at least one heating element, which is preferably arranged in the at least one heating section and configured as a hot-air device, for locally heating the at least one joining zone. By means of this embodiment, the at least one joining zone is likewise heated particularly efficiently and particularly in a locally limited manner while avoiding a heating of the heat exchanger plates outside of the joining zone. Partial melting of the heat exchanger plates when joining the latter to form the heat exchanger is thus particularly strongly reduced or even completely avoided, and the energy consumption and the manufacturing time when producing the heat exchanger are considerably reduced.

According to one advantageous embodiment, the brazing tool comprises at least one cooling device, in particular a cooling-air device, which is preferably arranged in the at least one heating section, for curing by cooling a solder wetting the at least one joining zone. By means of this embodiment there is achieved a production of the heat exchanger having a particularly low energy consumption and a particularly short manufacturing time, and there is produced a heat exchanger having a particularly high mechanical strength.

The brazing tool particularly advantageously comprises at least one temperature-measuring device, which is arranged in the at least one heating section, for measuring a temperature of the at least one joining zone. This allows control of a joining temperature during the local heating of the at least one joining zone, with the result that a solidus temperature of the heat exchanger plates of the heat exchanger that are to be joined to one another is as far as possible not exceeded or exceeded only to a minor degree. Partial melting of the heat exchanger plates of the heat exchanger is thus particularly effectively reduced or even avoided, and the energy consumption when producing the heat exchanger is kept particularly low.

Further important features and advantages of the invention will emerge from the dependent claims, from the drawings and from the associated description of the figures on the basis of the drawings.

It will be understood that the features mentioned above and those still to be explained below may be used not only in the respectively specified combination, but also in other combinations or in isolation, without departing from the scope of the present invention.

A preferred exemplary embodiment of the invention is illustrated in the drawings and is explained in more detail in the following description.

DETAILED DESCRIPTION

Figure 1:
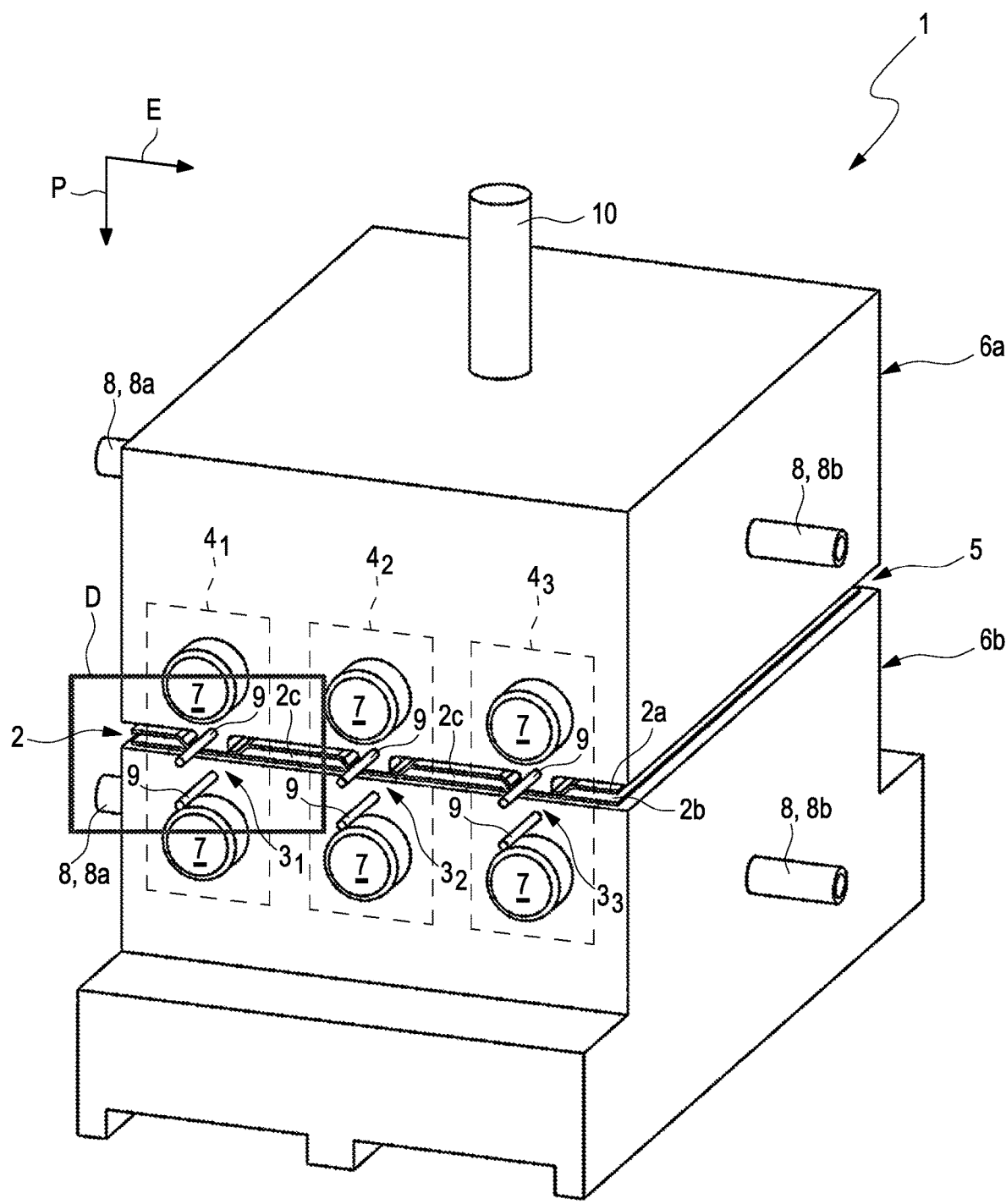
FIG. 1 schematically shows an example of a brazing tool according to the invention in a perspective illustration with a heat exchanger according to the invention arranged therein, FIG. 2 schematically shows a detail illustration D of the brazing tool of FIG. 1.
Figure 2:
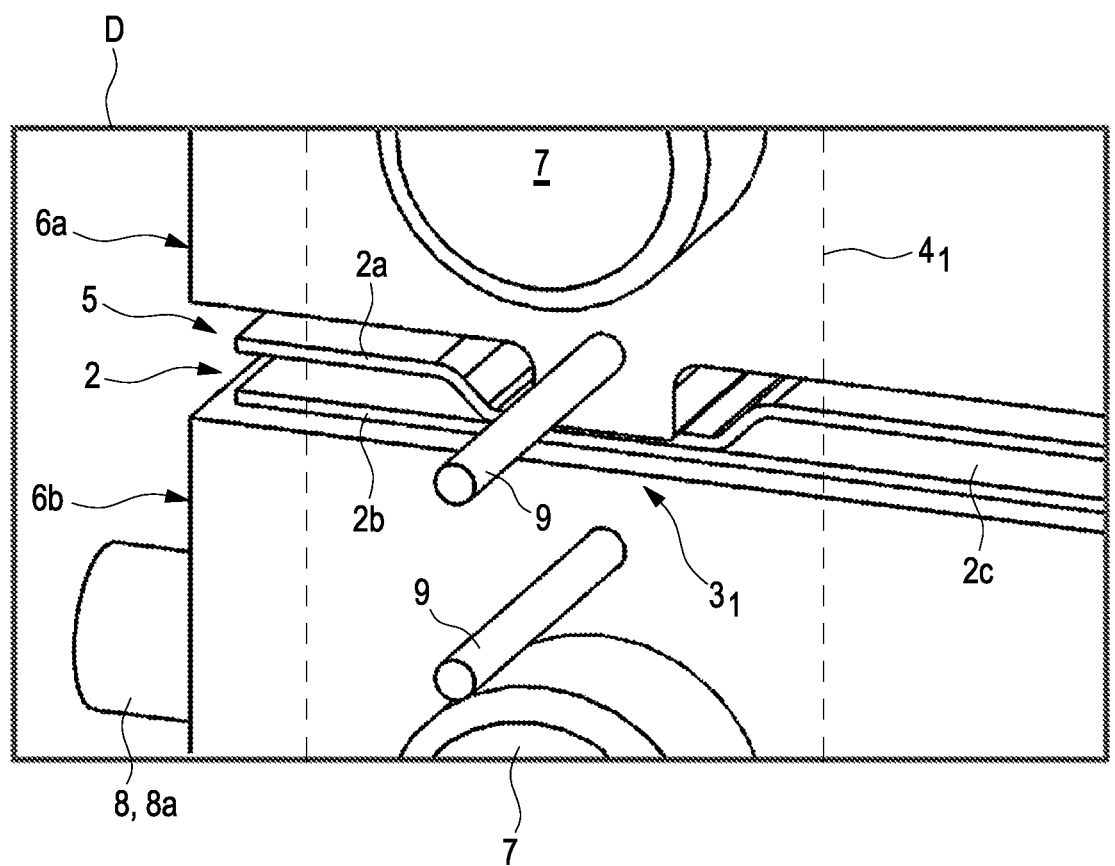

FIGS. 1 and 2 illustrate an example of a brazing tool 1 according to the invention for producing a heat exchanger 2 according to the invention which can be used in turn for cooling a battery module (not shown in FIGS. 1 and 2) having a plurality of battery cells. FIG. 2 here is a detail illustration of the partial section designated by "D" in FIG. 1.

The heat exchanger 2 to be produced consists in the example scenario of two heat exchanger plates 2a, 2b. The brazing tool 1 is designed to carry out the method according to the invention.

For this purpose, the brazing tool 1 has a plate receptacle 5 in which the two heat exchanger plates 2a, 2b to be joined to one another can be arranged. In addition, the brazing tool 1 comprises by way of example three heating sections $4_1$, $4_2$, $4_3$ for locally heating in each case a common local joining zone $3_1$, $3_2$, $3_3$ of the two heat exchanger plates 2a, $2_b$. Here, the joining zone $3_1$ is arranged in the region of the heating section $4_1$, the joining zone $3_2$ is arranged in the region of the heating section $4_2$, and the joining zone $3_3$ is arranged in the region of the heating section $4_3$. The joining zones $3_1$, $3_2$, $3_3$ are defined here by regions of the two heat exchanger plates 2a, 2b that bear locally against one another.

Furthermore, the brazing tool 1 comprises two pressing elements 6a, 6b for pressing together the two heat exchanger plates 2a, 2b in the region of the joining zones $3_1$, $3_2$, $3_3$, with the two pressing elements 6a, 6b delimiting the plate receptacle 5 perpendicular to a pressing direction P and along a direction of extent E of the two heat exchanger plates 2a, 2b. Here, the direction of extent E runs perpendicular to the pressing direction P. In the example of FIGS. 1 and 2, the three heating sections $4_1$, $4_2$, $4_3$ each extend both over and beyond the first and over and beyond the second pressing element 6a, 6b and are arranged at a distance from one another perpendicular to the pressing direction P and along the direction of extent E or along the plate receptacle 5.

Furthermore, the brazing tool 1 comprises by way of example six heating elements 7, which are configured as electrical heating bars, are arranged in respective pairs in one of the three heating sections $4_1$, $4_2$, $4_3$ and each serve for locally heating the respective joining zone $3_1$, $3_2$, $3_3$ arranged in the associated heating section $4_1$, $4_2$, $4_3$. Here, in each case one of the two electrical heating elements 7 arranged in the respective heating sections $4_1$, $4_2$, $4_3$ is arranged in the pressing element 6a of the brazing tool 1, and the other of the two heating elements 7 is arranged in the respective heating sections $4_1$, $4_2$, $4_3$ in the pressing element 6b of the brazing tool 1. The electrical heating elements 7 here are situated opposite one another in pairs in the heating sections $4_1$, $4_2$, $4_3$ along the pressing direction P. In addition, the electrical heating elements 7 are arranged at a distance from one another along the direction of extent E. It is also conceivable that, alternatively or additionally, the brazing tool 1 comprises at least one heating element 7 which is configured as an electrical induction device, as an infrared irradiating device or as a hot-air device (in each case not shown in FIGS. 1 and 2) and intended for locally heating the joining zones $3_1$, $3_2$, $3_3$. This heating element 7 can be arranged in an analogous manner to the above-explained electrical heating bars.

In the example of FIGS. 1 and 2, the brazing tool 1 additionally has two cooling devices 8, through which cooling air can flow and which are configured as heat exchangers, for curing a solder, which wets the joining zones $3_1$, $3_2$, $3_3$, by cooling the respective joining zone $3_{10}$, $3_2$, $3_3$. For this purpose, heat is transferred from the respective joining zone $3_1$, $3_2$, $3_3$ to the cooling air flowing through the cooling device 8. Here, the cooling devices 8 each comprise a cooling-air inlet 8a and a cooling-air outlet 8b for channeling the cooling air in and out. One of the two cooling devices 8 is arranged here in the pressing element 6a of the brazing tool 1. The other of the two cooling devices 8 is arranged in the pressing element 6b of the brazing tool 1. It is also conceivable that, for improved cooling of the joining zones 31, 32, 33, cooling devices 8 are in each case arranged in the heating sections $4_i$, $4_2$, $4_3$.

Furthermore, in the example of FIGS. 1 and 2, the brazing tool 1 has six temperature-measuring devices for measuring the temperature in the respective joining zone $3_1$, $3_2$, $3_3$. Here, two temperature-measuring devices 9 are arranged in each of the heating sections $4_1$, $4_2$, $4_3$, with in turn one of the two temperature-measuring devices 9 being arranged in the pressing element 6a and the other of the two temperature-measuring devices 9 being arranged in the pressing element 6b. Furthermore, the brazing tool 1 comprises a pressing rod 10 for pressing the pressing elements 6a, 6b together. Here, the pressing rod 10 is arranged on the pressing element 6a and is designed in such a way that it transfers a force of a pressing device (not shown in FIGS. 1 and 2) to the pressing element 6a and thus presses the latter along the pressing direction P in the direction of the pressing element 6b.

The heat exchanger 2 arranged in the plate receptacle 5 of the brazing tool 1 has been produced by means of the method according to the invention. This method will be explained below by way of example:

In the method according to the invention for producing the heat exchanger 2, consisting of two heat exchanger plates 2a, 2b, the two heat exchanger plates 2a, 2b of the heat exchanger 2 that are to be joined to one another are first of all provided, with the common joining zones 31, 32, 33 of the two heat exchanger plates 2a, 2b being wetted with solder. It is also conceivable here for only one of the two joining partners, that is to say one of the two heat exchanger plates 2a, 2b, to be wetted with solder. Alternatively, it can be envisioned that both joining partners, that is to say both heat exchanger plates 2a, 2b, are wetted with solder.

Next, the two heat exchanger plates 2a, 2b are arranged in the plate receptacle 5a of the brazing tool 1 in such a way that the joining zones $3_1$, $3_2$, $3_3$ are each arranged in one of the heating sections $4_1$, $4_2$, $4_3$. In the example of FIGS. 1 and 2, the pressing element 6a delimiting the plate receptacle 5 has here, in each of the heating sections $4_1$, $4_2$, $4_3$ a respective projection which engage in one of a plurality of depressions in the plate $2_a$ and serve for pressing together the two heat exchanger plates 2a, 2b in the respective region of the joining zones $3_1$, $3_2$, $3_3$.

Next, the two heat exchanger plates 2a, 2b are pressed together in the region of the joining zones $3_1$, $3_2$, $3_3$ by means of the pressing elements 6a, 6b by way of a pressure transferred by means of the pressing rod 10.

In one variant of the example, it is conceivable for the two heat exchanger plates 2a, 2b to be wetted with solder only after they have been arranged in the plate receptacle 5a.

During the pressing-together of the two heat exchanger plates 2a, 2b, the joining zones $3_1$, $3_2$, $3_3$ are locally heated by means of the electrical heating elements 7 arranged in the associated heating sections $4_1$, $4_2$, $4_3$, with the result that the solder wetting these joining zones $3_1$, $3_2$, $3_3$ melts and the two heat exchanger plates 2a, 2b are brazed to form the heat exchanger 2.

During the heating of the joining zones $3_1$, $3_2$, $3_3$, it is possible here, by means of the temperature-measuring devices 9, for actual temperatures of the associated joining zones $3_1$, $3_2$, $3_3$ to be measured. It is thus possible, by means of an open-loop control/closed-loop regulating device (not shown in FIGS. 1 and 2) of the brazing tool 1, for the heating of the joining zones $3_1$, $3_2$, $3_3$ to be controlled/regulated in each case to the desired setpoint joining temperature(s). The joining zones $3_1$, $3_2$, $3_3$ are preferably each heated to a joining temperature which lies below a solidus temperature of the two heat exchanger plates 2a, 2b.

Next, the joining zones $3_1$, $3_2$, $3_3$ are cooled by means of the cooling devices 8 and consequently the solder wetting these joining zones $3_1$, $3_2$, $3_3$ is cured. It is possible in this way for the two heat exchanger plates 2a, 2b to be joined together in an accelerated manner and for the heat exchanger 2 produced to be removed more quickly from the brazing tool 1 than without cooling.

The heat exchanger 2 produced in the manner presented above has two cooling ducts 2c for conducting a cooling fluid that extend perpendicular to the direction of extent E. The cooling ducts 2c are formed here by interspaces between the two heat exchanger plates 2a, 2b and the joining zones $3_1$, $3_2$, $3_3$. A heat exchanger 2 produced in such a way serves in particular for cooling a battery module, having a plurality of battery cells, of a motor vehicle (not shown in FIGS. 1 and 2) by thermal interaction with this battery module. Here, one of the two heat exchanger plates 2a, 2b can serve as a bearing surface for the battery module to be cooled.

The invention claimed is:

1. A method for producing a heat exchanger comprising:
   a) providing two heat exchanger plates of the heat exchanger that are to be joined to one another;
   b) wetting at least one common local joining zone of the two heat exchanger plates with solder;
   c) forming the heat exchanger by brazing the two heat exchanger plates via local heating of the at least one common local joining zone with at least one heating section of a brazing tool; and
   pressing the two heat exchanger plates together in a region of the at least one common local joining zone by at least one pressing element of the brazing tool that is configured for locally heating the at least one common local joining zone, wherein the at least one pressing element has a projection disposed in the at least one heating section that engages against one of the heat exchanger plates for pressing the two heat exchanger plates together.

2. The method according to claim 1, wherein pressing the two heat exchanger plates together in the region of the at least one common local joining zone is performed during or after brazing.

3. The method according to claim 2, wherein in step c), the at least one common local joining zone is locally heated via at least one heating element configured as an electrical induction device.

4. The method according to claim 2, wherein in step c), the at least one common local joining zone is locally heated via at least one heating element configured as an electrical heating bar.

5. The method according to claim 2, wherein in step c), the at least one common local joining zone is locally heated via at least one heating element configured as an infrared irradiating device.

6. The method according to claim 2, wherein in step c), the at least one common local joining zone is locally heated via at least one heating element configured as a hot-air device.

7. The method according to claim 1, wherein at least one of:
   in step c), the at least one common local joining zone is locally heated via at least one heating element configured as an electrical induction device;
   in step c), the at least one common local joining zone is locally heated via at least one heating element configured as an electrical heating bar;
   in step c), the at least one common local joining zone is locally heated via at least one heating element configured as an infrared irradiating device; and
   in step c), the at least one common local joining zone is locally heated via at least one heating element configured as a hot-air device.

8. The method according to claim 1, further comprising c1) curing the solder by cooling the at least one common local joining zone via a cooling-air device where cooling air is channeled through the brazing tool in a region of the at least one heating section having at least one heating element configured to locally heat the at least one common local joining zone.

9. The method according to claim 1, further comprising measuring a temperature of the at least one common local joining zone via a temperature-measuring device arranged in the at least one pressing element at the at least one heating section.

10. The method according to claim 9, wherein local heating of the at least one common local joining zone includes regulating a heat input of the at least one common local joining zone to a desired setpoint joining temperature based on the temperature measured by the temperature-measuring device.

11. The method according to claim 1, wherein the projection is disposed in the at least one heating section that contains a heating element for local heating of the at least one common local joining zone.

12. A method for producing a heat exchanger, comprising:
   providing two heat exchanger plates of the heat exchanger that are to be joined to one another;
   wetting at least one common local joining zone of the two heat exchanger plates with solder;
   brazing the two heat exchanger plates together via local heating of the at least one common local joining zone by a heating element arranged in at least one heating section of a brazing tool;
   pressing the two heat exchanger plates together in a region of the at least one common local joining zone by at least one pressing element of the brazing tool, wherein the at least one pressing element has a projection disposed in a region of the at least one heating section that engages against one of the heat exchanger plates for pressing the two heat exchanger plates together; and curing the solder by cooling the at least one common local joining zone via a cooling-air device where cooling air is channeled through the brazing tool in a region of the at least one heating section.

13. The method according to claim 12, wherein the cooling-air device is arranged in the at least one pressing element and has a cooling-air inlet and a cooling-air outlet for channeling the cooling air in and out of the brazing tool.

14. The method according to claim 12, further comprising measuring a temperature of the at least one common local joining zone via a temperature-measuring device arranged in the at least one pressing element at the at least one heating section.

15. The method according to claim 14, wherein local heating of the at least one common local joining zone includes regulating a heat input of the at least one common local joining zone to a desired setpoint joining temperature based on the temperature measured by the temperature-measuring device.

16. The method according to claim 12, wherein the heating element is configured as an electrical induction device.

17. The method according to claim 12, wherein the heating element is configured as an electrical heating bar.

18. The method according to claim 12, wherein the heating element is configured as an infrared irradiating device.

19. The method according to claim 12, wherein the heating element is configured as a hot-air device.

* * * * *